Jan. 22, 1935.  A. WESTPHAL  1,988,884
MEASURING DEVICE
Filed March 7, 1931
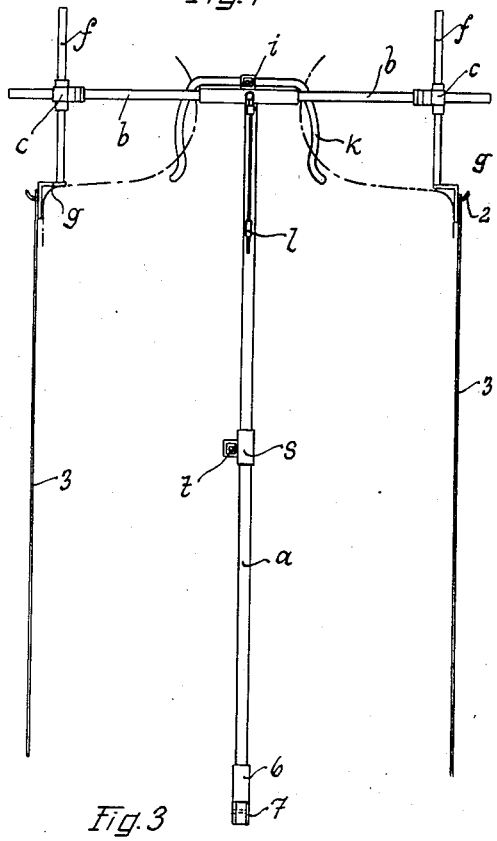
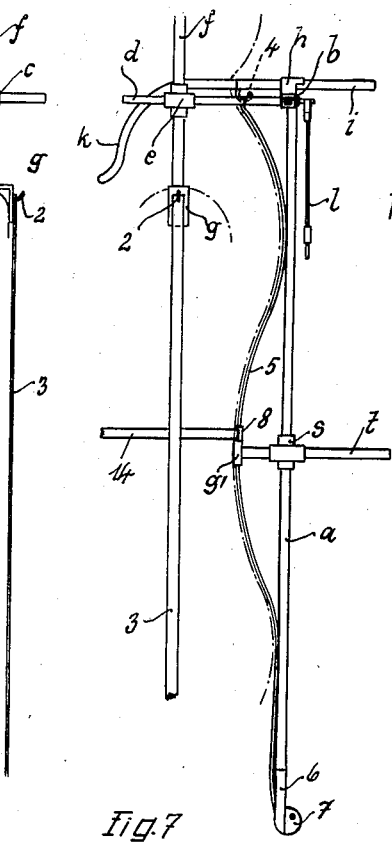
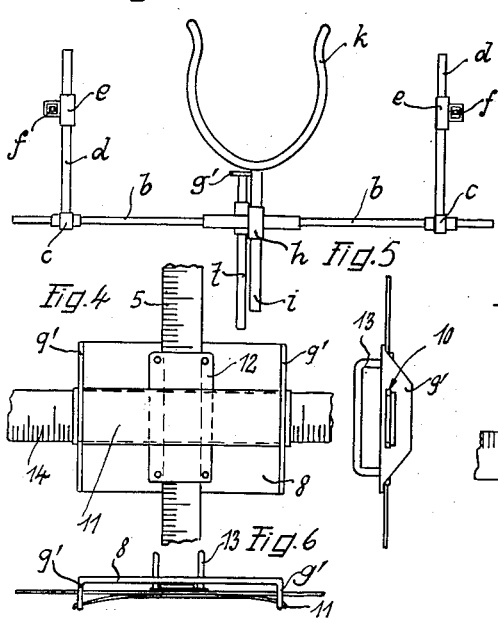
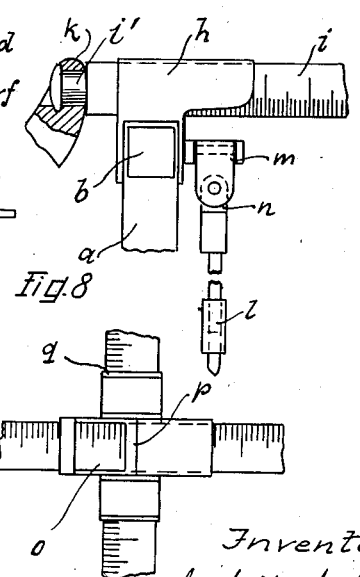
Inventor:
Albert Westphal
By B. Singer, atty.

Patented Jan. 22, 1935

1,988,884

UNITED STATES PATENT OFFICE 1,988,884

MEASURING DEVICE

Albert Westphal, Berlin-Neukolln, Germany

Application March 7, 1931, Serial No. 520,890
In Germany March 11, 1930

4 Claims. (Cl. 33—2)

This invention relates to a device, by means of which an accurate determination of the mutual position of the parts of the body is possible, in order to quickly and accurately take the measurements for articles of clothing. The entire measuring device is suspended pivotally on a bow, which rests in a certain manner on the shoulders and bears against the point of the spinal column, at the seventh neck vertebra which projects when the head is being nodded and from which bending of the neck starts. This vertebra has always been assumed to be the point from which measurements are taken by tailors and from which the measurements necessary in the tailoring of suits start. The measuring device thus automatically assumes the proper position after the bow has been correctly placed and thus an accurate taking of measurements is possible without any estimating, and excluding wrong calculations.

All measurements extend from this stationary pivot point assumed on the point of the spinal column and the measurements for making the articles of clothing can therefore be taken in the proper manner for all proportions and shapes of the body and also test measurements can be taken. The mutually adjustable rigid rules are provided with tape measures, by means of which the exact length of certain body curvatures or curved lines or their parts can be determined from the fixed point.

An embodiment of the invention is illustrated by way of example in the accompanying drawing in which:

Fig. 1 shows the device in rear elevation.

Fig. 2 is a side elevation of the device.

Fig. 3 is a top elevation.

Figs. 4 to 6 show different views of a shiftable rule holder.

Fig. 7 shows the plumb in elevation.

Fig. 8 is an elevation of a point of intersection of two rules.

A rod $a$ is placed against the body in the centre of the back, as shown in Figs. 1 and 2, a second horizontal rod $b$, extending at right angles to and rigidly connected with the rod $a$, is provided with scales and carries on slides $c$ rods $d$ arranged at right angles to the rod $b$. The rods $d$ are provided with scales and carry on slides $e$ vertically adjustable rods $f$ provided with scales with angular supporting plates $g$.

At the point of intersection of the rods $a$ and $b$ a bearing sleeve $h$ is provided, in which a rod $i$, provided with scales, rests shiftable in longitudinal direction and rotatably accommodates the bow part $k$, said rod having a bearing stud $i'$ at its front end on which the bow part or neck yoke $k$ is mounted for rotation in a vertical plane. Hence the assembly comprising the bars $a$ and $b$ can swing laterally, being pivotally connected to and suspended from the neck yoke.

At the same point of intersection a pendulum or plumb $l$ is arranged which is suspended Cardan-like with the aid of two pivot bearings $m$, $n$ at right angles to one another, so that the accurate horizontal position of the rod $b$ and the accurate vertical position of the rod $c$ can be determined with the aid of a single plumb $l$.

When the pawl or yoke $k$ is applied to the neck so that the bent portion rests against the seventh vertebra and the apparatus is permitted to hang down freely, the cross part $a$, $b$ will automatically assume a position on account of the rotatability of the yoke $k$ and bar $i$ in such manner that the bar $a$ stands vertically and the bar $b$ stands horizontally. By means of the plumb $l$ the accurate adjustment may be controlled and corrected and it will be seen from Figures 1 and 2 in which condition the apparatus has been accurately adjusted. In this condition the plumb extends parallel to all of the edges of the bar $a$. There is no special indicator required for this purpose. It can be seen at a glance whether the plumb is actually parallel to all of the edges or whether one of them is at an angle.

If the body of the person to be measured is stooped, the sleeve $h$ may be adjusted rearwardly on the rod $i$ to permit the bar $a$ to assume a perfectly vertical position and to touch the body of the person being measured at one point only, but the measure can be taken just as with a normal body.

Fig. 8 shows the point of intersection of two scales with slides or shiftable rods. It will be seen that either openings $o$ are provided so that the number can be read at an edge $p$, or a slide part may be provided with an edge $q$ on its outer end, from which the number can be read. A slide $s$ is mounted on the rod $a$ and slidably carries a rod $t$ provided with a scale, which is also provided with an abutment support $g$.

The entire device is placed with the bow $k$ on the body so that this bow $k$ surrounds the neck and, as shown in Fig. 1, the parts extending towards the front and downwardly bear against the chest. Thus the apparatus adjusts itself automatically to a certain point from which the measurements must be taken.

The downwardly projecting part of the supporting plates $g$ bears against the outer shoulder and is provided on each side with a suitable holding device for a rule, for example a hook 2, on which a rule 3 is suspended at its end by means of an eye. It is thus possible from this fixed point to determine the exact length of sleeve required.

The bow part or neck yoke k is so constructed that it surrounds the rear part of the neck and is so bent forwards and downwards that it rests on the chest in such a manner that the accurate automatic fitting can be effected by the two points on the chest and the point on the neck. As the entire apparatus is suspended rotatably on the bow part, the apparatus can be adjusted as desired relative to the bow part. On the bow part or on its supporting rod i, near its pivot point, a holding means for a rule is also provided, for example a hook 4. A so-called spring tape measure 5, i. e. a tape measure which automatically adjusts itself in a casing, is suspended by a suitable eye on the hook 4. This tape measure, owing to its spring in the casing, is automatically stretched in any position. In this manner the tape measure 5 always bears so that the desired distances between the neck and back or back and waist or back and seat can be accurately determined.

The spring casing 6 for accommodating the tape measure 5 can preferably be slipped by a sleeve 7 on the end of the rod c. When the tape measure has been suspended on the hook 4, it is possible from this point to easily and accurately determine the length of any curvature or the desired mutual distances between two fixed points, in that the measuring point is accurately determined from which the measuring is to commence.

The accurate determination of the curve is readily made because the parts s, t, g can be longitudinally shifted on the bar a and the bar t is adjustable in itself in the slide. If I now travel along the bar t I can read at any time and at any point the proper distance of the body from the rod a. This reading is possible by the scale which is mounted on the slidable rod t. Therefore, it is not only feasible to determine the length of the curve but the shape of the curve itself owing to its accurate distance from the vertical line.

A slide automatically adjustable into any position, yet easily shiftable, is arranged on the tape measure 5. This slide consists of a base plate 8 with lateral bent portions 9. A slot 10 is provided in each of the lateral bent portions 9, in which a blade spring 11 is mounted, which bears against a plate 12 shiftably mounted in the plate 8, so that this plate 12 is always pressed against the plate 8. On the plate 12 two bows 13 are provided, the ends of which extend through openings in the plate 8. A tape measure 14, which is employed for measuring the circumference of the body at different points passes through the openings 10 in the end portions 9 of plate 8 and is frictionally gripped by and between the plate 12 and the spring 11. Owing to the fact that the plate 8 can be very accurately fixed on the rule 5 and the initial point of the rule 5 is also determined, it is therefore possible to fix the certain points at which the body circumference must be measured and make the article of clothing with the utmost accuracy. The plate 8 adjusts itself rigidly in every position on the rule 5 and can nevertheless be easily shifted.

The individual rods are provided with scales so that any adjustment can be accurately read immediately relative to certain points.

I claim:—

1. A measuring device of the class described, comprising a neck yoke arranged to bear upon the chest and against the back of the neck and having a rearwardly extending arm provided with a scale, a sleeve movably mounted on said arm, a horizontal rod carried by said sleeve and provided with scales, slides on said rod arranged to coact with said scales, forwardly extending horizontal rods carried by said slides and having scales, slides shiftably mounted on said forwardly extending horizontal rods and arranged to coact with the scales thereof, axially adjustable vertical rods mounted in said slides and adapted to bear on the shoulders, said rods having scales to coact with said slides; a vertical back rod depending from the slide on the center of the first named horizontal rod, a slide vertically adjustable on said back rod, a horizontal rod carried by said slide, movable toward and from the back and having a scale coacting with said slide, a measuring tape attached to the yoke and the lower end of the back rod and a second tape for measuring the circumference of the body connected to the first named tape.

2. Measuring apparatus of the class described, comprising a T structure for arrangement on the back, a neck and chest yoke to support the T structure, said T structure being adjustable forwardly and rearwardly with respect to the yoke, and vertically adjustable members adapted to bear on the shoulders and carried by the horizontal member of the T structure.

3. A measuring device of the class described, comprising a neck yoke, a T member for arrangement on the back of the figure to be measured and freely pivotally connected at its upper end to and suspended from the neck yoke for lateral swinging movement relative to said figure and measuring devices carried by said T member.

4. A measuring device of the class described, comprising a neck yoke, a T member for arrangement on the back of the figure to be measured, said T member being freely pivotally connected to and suspended by the T yoke for lateral swinging movement relative to said figure and also shiftable toward and from the yoke, a measuring tape suspended from the yoke, and a member engaged by said measuring tape and connected to and shiftable toward and from the vertical element of said T member.

ALBERT WESTPHAL.